Aug. 26, 1941. B. A. PROCTOR Re. 21,888

PHONOGRAPH DRIVE

Original Filed Sept. 30, 1936 6 Sheets-Sheet 1

INVENTOR

Barton A. Proctor

BY

Moses & Holt

ATTORNEY

PHONOGRAPH DRIVE

Original Filed Sept. 30, 1936 6 Sheets-Sheet 2

PHONOGRAPH DRIVE

Original Filed Sept. 30, 1936 6 Sheets-Sheet 3

INVENTOR
Barton A. Proctor
BY
Moses & Nolte.
ATTORNEY

PHONOGRAPH DRIVE

Original Filed Sept. 30, 1936 6 Sheets-Sheet 4

INVENTOR
Barton A. Proctor
BY
Moses & Nolte.
ATTORNEY

Aug. 26, 1941. B. A. PROCTOR Re. 21,888

PHONOGRAPH DRIVE

Original Filed Sept. 30, 1936 6 Sheets-Sheet 5

INVENTOR
Barton A. Proctor
BY
Moses & Nolte
ATTORNEY

PHONOGRAPH DRIVE

Original Filed Sept. 30, 1936 6 Sheets-Sheet 6

INVENTOR

Barton A. Proctor,

BY

Moses & Holte.

ATTORNEY

Reissued Aug. 26, 1941 Re. 21,888

UNITED STATES PATENT OFFICE 21,888

PHONOGRAPH DRIVE

Barton A. Proctor, Larchmont, N. Y., assignor to B. A. Proctor Company, Inc., New York, N. Y., a corporation of New York Original No. 2,188,087, dated January 23, 1940, Serial No. 103,269, September 30, 1936. Renewed November 16, 1939. Application for reissue February 21, 1941, Serial No. 380,025

17 Claims. (Cl. 74—281)

This invention relates to apparatus for recording and playing sound records, and more particularly to mechanism for turning the table upon which the record is rotated for either operation.

Conventional machines for the stated purpose are, in general, designed to operate at different speeds for different purposes, that is to say the rotating table upon which the record is presented to the working instrument is rotated at different speeds, which, however, bear a fixed ratio to the speed at which the instrument is caused to traverse the portion of the record member provided with the sound record, or upon which the sound track is to be recorded.

Two different speeds of rotation may be cited as characteristic of those desirably provided for, viz., of rotative speed of 78 R. P. M., at the axis of rotation of the blank, and a rotative speed of 33⅓ R. P. M., it being understood that means are provided for causing a suitable instrument to traverse the rotating record member at a fixed ratio throughout the period of recording, or of playing, as the case may be.

Under such conditions, it is desirable that the means for rotating the table carrying the blank shall operate with the greatest possible smoothness and regularity of speed; also that the speed communicated to the blank shall be exactly that demanded for an operation of a given character, and finally that the changes of speed shall be under control of the operator and may be effected with a minimum shock or disturbance to the mechanism.

A further requirement for accurate and firm actuation of the rotating table at different rotative speeds arises from the fact that a wide variety of materials is at the present time being tried comparatively to determine their relative merits for use in the composition of the record blanks and final records, and these various materials have different properties, the characteristics of which must be ascertained by tests involving the aforesaid change of rotative speeds, provision being necessary to avoid the intrusion of any vibrations other than those which it is desired to record or to reproduce.

This is well known to musicians, and it is also generally recognized that, as between different kinds of musical instruments, even of the same order, for example as between such string instruments as the piano and the violin, the latter is susceptible of much the greater delicacy of tone production.

For many reasons, it has been found that the actuation of the rotating table by gears does not give altogether satisfactory results, and that while a belt transmission affords a fairly satisfactory means for driving the cutting tool and causing its traverse at a fixed ratio to the speed of rotation of the table, the said rotation must be effected by a means less liable to slip and less subject to atmospheric conditions than a belt, but not so harsh and limited in variation as a gear, or set of gears.

Accordingly, an object of the present invention is to provide a novel and improved means for driving the rotating table of a machine capable of use in either recording such records or playing them, at such speeds as may be desirable, within a definite range of speeds, and with great accuracy, steadiness and smoothness at each selected speed.

Another object is to provide means for effecting desired changes of speed with a minimum shock to the apparatus, and without wear likely to cause lost motion between the mutually contiguous parts.

Another object of the invention is to provide an improved form of fractional speed changing power transmitting mechanism of the type characterized generally by a series of balls or anti-friction rollers travelling between opposed annular members, and in which I have effected certain changes by which this form of drive is endowed with new characteristics and greater efficiency for purposes of its intended use.

A cognate object is to provide means by which the elements of a drive of this improved type may be readily coupled manually to rotate at the same speed, and selectively to operate at another speed, so that the double speed requirements for such a machine may be more readily satisfied than by existing means for this purpose.

Conventional machines for cutting records are frequently used in situations where their efficiency is seriously hampered by vibrations originating within the building or outside of the building in which the machine is installed, and these vibrations are propagated through the building walls and flow to the pedestal on which the machine is supported locally.

Under such conditions, it is practically impossible to secure recording with a desirable delicacy at some times, and accordingly it is an object of the present invention to provide for complete shock and vibration insulation at the place of support of the recording machine, and at the various critical regions of the machine itself through which the shocks, tremors or vibrations are communicated to the record blank-support, and to the support for the cutting tool.

Another object is to make it possible to use for purposes of damping vibration various devices which are known in their application to other purposes, but which are of novel, important, and unobvious utility in the particular physical embodiment of the idea of means underlying the invention herein disclosed.

Other objects and advantages will appear as the description of the particular physical embodiment selected to illustrate the invention progresses, and the novel features of the invention will be particularly pointed out in the appended claims.

In describing the invention in detail, and the particular physical embodiment selected to illustrate the invention, reference will be had to the accompanying drawings, and several views thereof, wherein like characters of reference designate corresponding parts, and in which.

The drawings illustrate various physical embodiments of the invention differing principally in the vertical organization of the pedestal and operating parts carried thereby, but having in common numerous features which will be described with suitable reference to those figures of the drawings in which they are most clearly illustrated.

Figure 1:
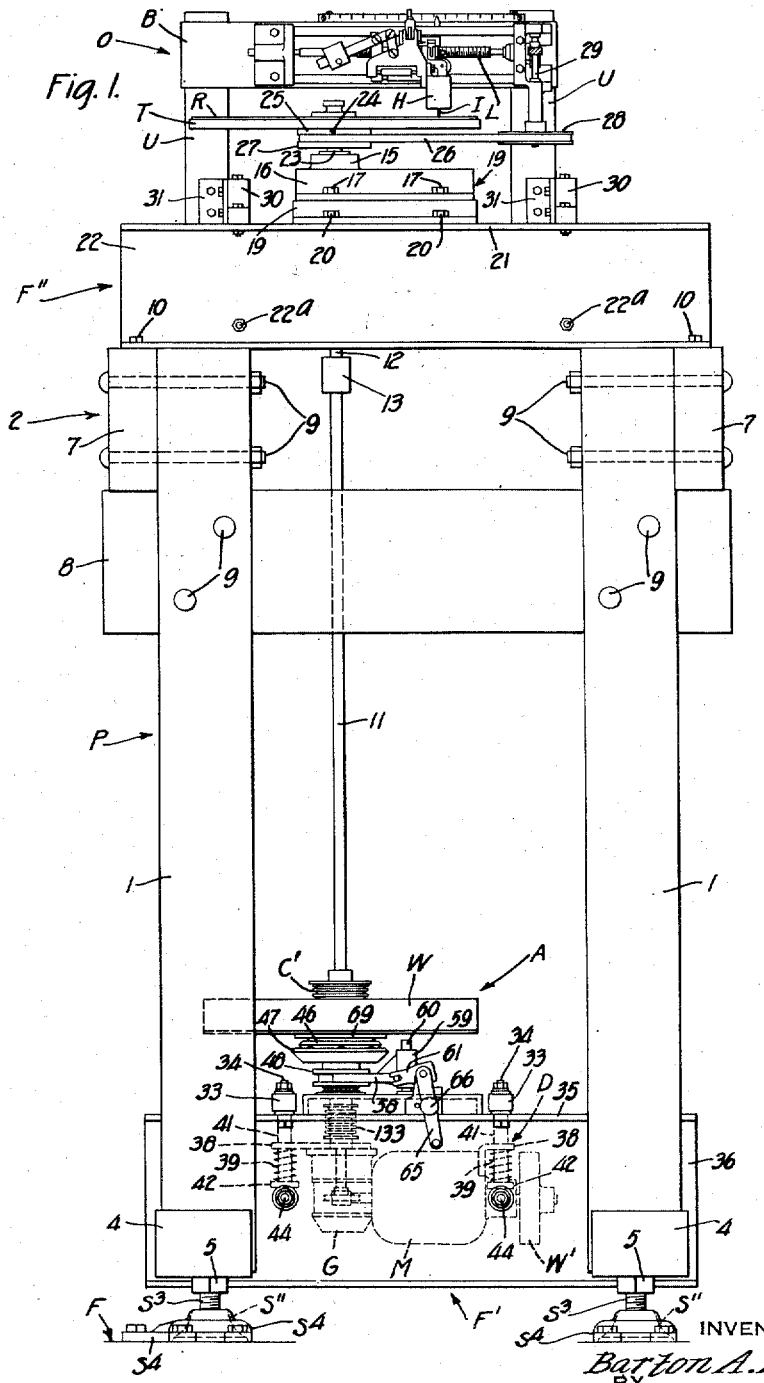
Fig. 1 is a view in front elevation of a machine for use in the fabrication of sound records.
Figure 2:
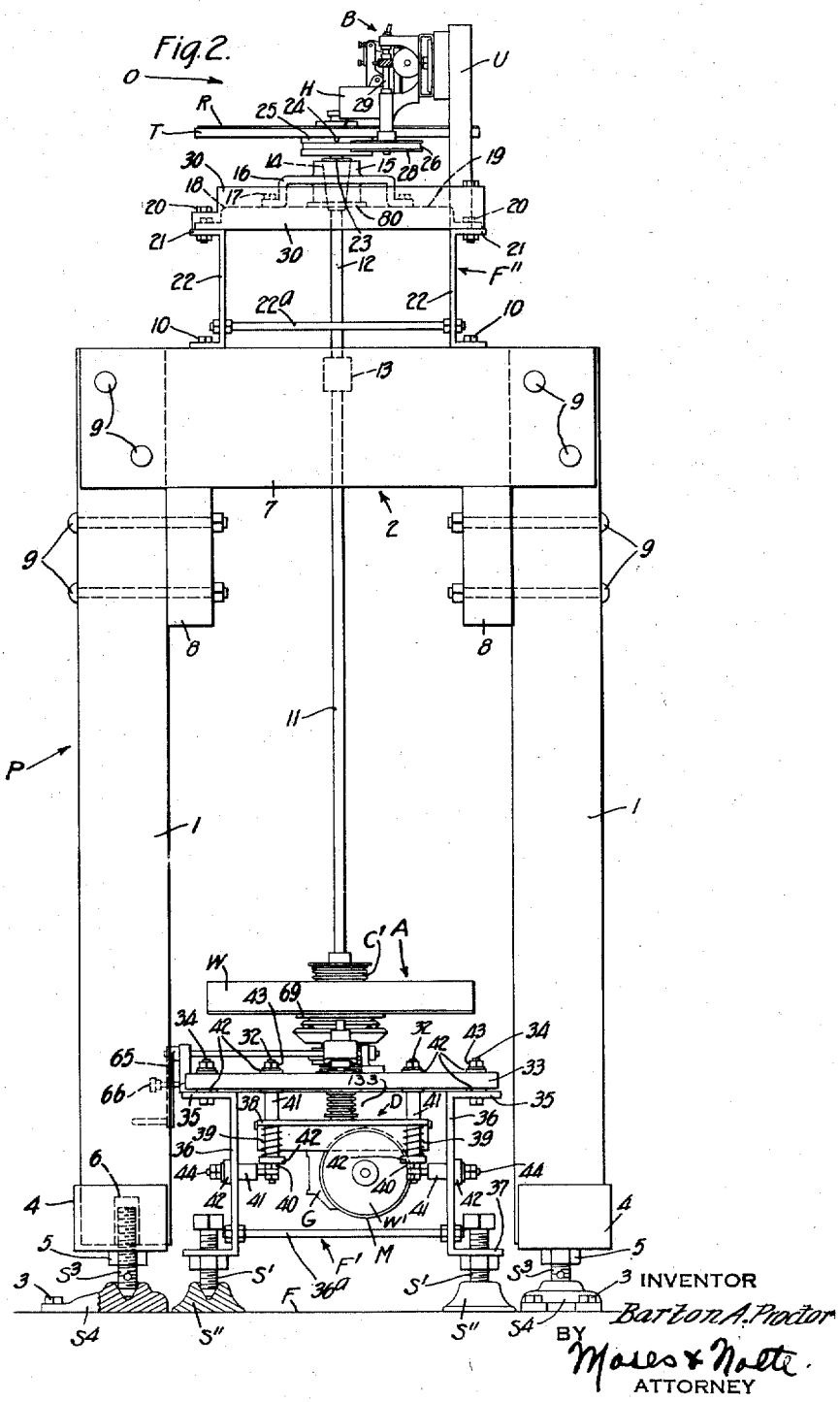
Fig. 2 is a side view thereof.

In general, Figs. 1 and 2 show what may be termed a high type of organization, in which a recording and/or playing unit, designated generally by the reference character O, is spaced vertically at a substantial height above an actuating unit, designated generally by the reference character A, the supporting structure for the upper unit comprising an elongated framework or pedestal designated generally P.

This form of embodiment has been found in practice to have substantial advantages for certain purposes over the more compact organization shown in other figures of the drawings, in which, however, various objects of the invention, common to both types, are realized with equally satisfactory results for other purposes.

In the type illustrated in Figs. 1 and 2, the actuating unit A includes a frame, designated generally F′, which derives its support from the foundation F, independently of the pedestal P. (see Fig. 2) by a set of levelling screws S′ and coasters S″.

The framework of the pedestal P comprises uprights 1 and a top 2, the uprights having levelling screws S3 and castors S4 which are desirably bolted to the foundation F, as at 3. Metal shoes 4 serve as abutments for the adjusting units 5, and aid to absorb vibrations at this region, the lower extremities of the uprights 1 being preferably recessed, as at 6 (see Fig. 2) to avoid contact of the screws S3 therewith.

The top structure of the pedestal is preferably reinforced strongly, as by plates 7 and cross-pieces 8, secured by bolts 9, and upon this top is bolted, as at 10, the frame or base F″ for the unit O, which derives its power from the actuating unit A through a slender vertical shaft preferably formed in two sections 11 and 12, joined by a coupling 13, preferably of known vibration damping structure.

The upper end of shaft section 12 is provided with a conical bearing member 14 (see Fig. 2) journalled in a sturdy complemental bearing member 15 forming the hub of a spider 16 the legs of which are bolted as at 17 to the central web 18 of a stepped base plate 19 which is bolted at 20 to horizontal flanges 21 of channel beams 22, the latter being connected by spacer rods 22a and forming parts of the frame F″.

Upon the upper extremity 23 of the shaft part 12 is fixed, as by set screw 24, the hub 25 of the rotary table T which may be of any suitable construction for supporting and rotating a record or blank R to be operated upon or played by means of a suitable instrument I carried by the head H, which is actuated by conventional or suitable mechanism supported on the bridge or overhead structure, generally designated by the reference character B in the drawings and which need not be described at length at the present stage of the specification. For a detailed description of an overhead structure suitable for use in this connection, reference may be made to the co-pending application Serial No. 50,703. The mechanisms on bridge B are actuated in synchronism with table T by a belt 26 running from the hub 25 to a pulley 28 on a vertical shaft 29 carried by the bridge structure B. The bridge is supported by uprights U secured by means of angle plates 31, to cross-pieces 30, the latter being in turn bolted, as at 20, to flanges 21 of the channel beams 22.

In pursuance of the invention, the actuating unit A is formed with numerous novel structural provisions for eliminating vibrations and for preventing their propagation to the operating mechanism already briefly described.

In general, these provisions include means for supporting the motor M in such a manner as to absorb vibrations of a nature which at the present time, seems to result inevitably from the use of a synchronous type motor, this being the type preferred, for reasons that need not be described at length herein, but which relates to steadiness of speed, ease of control and economy in operation.

In the instance illustrated, the motor M and its gear box G constitute a unitary structure carried in a drop frame D mounted on springs 39 supported by posts 32 depending from cross-pieces 33 bolted as at 34 to flanges 35 of channel irons 36 whose lower flanges 37 are transfixed by the levelling screws S′ already described, the channel irons 36 being secured to each other by spacer rods 36a.

The preferred mode of supporting the drop-frame D, in pursuance of this feature of the invention, is to cause the posts 32 to transfix horizontal flanges 38 on the drop frame and to interpose coil springs 39 between such flanges and nuts 40 screwed upon threaded portions of the posts 32, the springs 39 affording a vibration absorbing suspension. In addition to the springs 39, further vibration-absorbing means are provided in the form of sleeves 41 of rubber or other elastic material, surrounding the posts 32, and wherever else indicated by that reference character, while washers 42 of similar elastic material are provided at the several regions so designated, as for example between the nuts 43 at the heads of the posts 32 and the adjacent portions of the cross-beams 33; also between the lower surfaces of the said cross-beams and the sleeves 41, and between the springs 39 and nuts 40, etc., it being noted that the thickness of these washers is desirably in proportion to the compressive strains encountered at any particular region.

Similar vibration absorbing washers and sleeves are shown in connection with the eyebolts 44 which afford horizontal stability to the posts 32, transfixing the webs of channel irons 36. The actuating mechanism, of which one form is designated generally by the reference character A in Figs. 1 and 2, is shown in greater detail in Figs. 3, 4, 5, and 6, and will now be described, it being understood that in Fig. 3 it is illustrated in direct connection with a rotating table T′ rather than with the extended shaft 11, 12 of Figs. 1 and 2. The table T′ of Fig. 3 is replaced by a flywheel W in the long type structure of Figs. 1 and 2, the shaft 11 being connected flexibly to the wheel W, as by a metal bellows coupling or connecting means C′.

By means of the key 45 (see Fig. 3) the member 46 is rotated by the upright main driving shaft 31 of transmission G, at a speed of, say, 33⅓ R. P. M., this being a well-known speed for the production of one kind of record in such a machine, and a convenient speed to maintain with the synchronous type motor M.

In pursuance of the invention, a means is provided to permit this speed to be stepped up to 78 R. P. M., as the speed at which the record-blank R is to be rotated in the recording operation for another type of record and for this purpose an annular track member 47 is fixed against rotation as by means of a clutch collar 48 provided with a locking stud 49 which is shown in Fig. 3 as entering a recess 50 in the base 51 of a socket member 52, there being several of these recesses 50 around said base.

Figure 3:
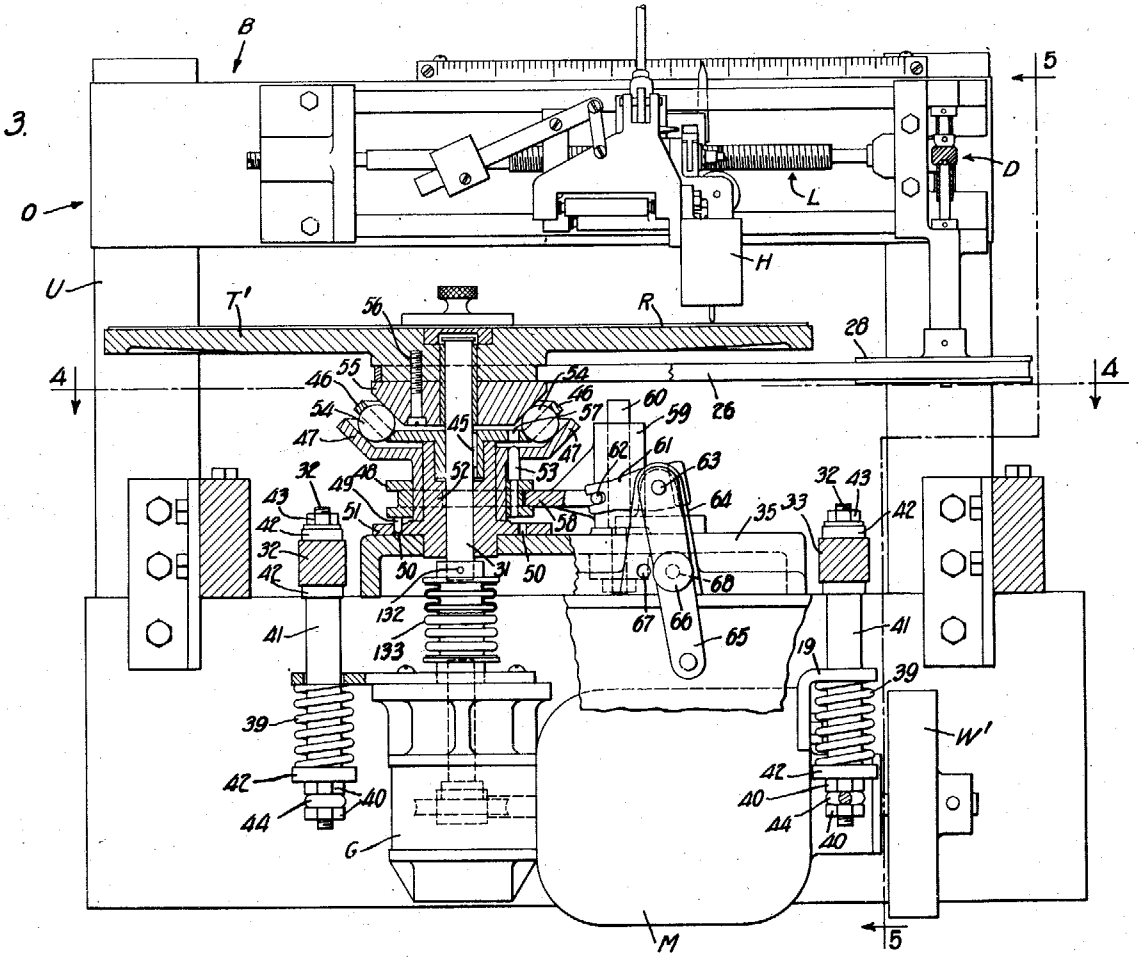
Fig. 3 is a front view in vertical section of a modification of Fig. 1.
Figure 4:
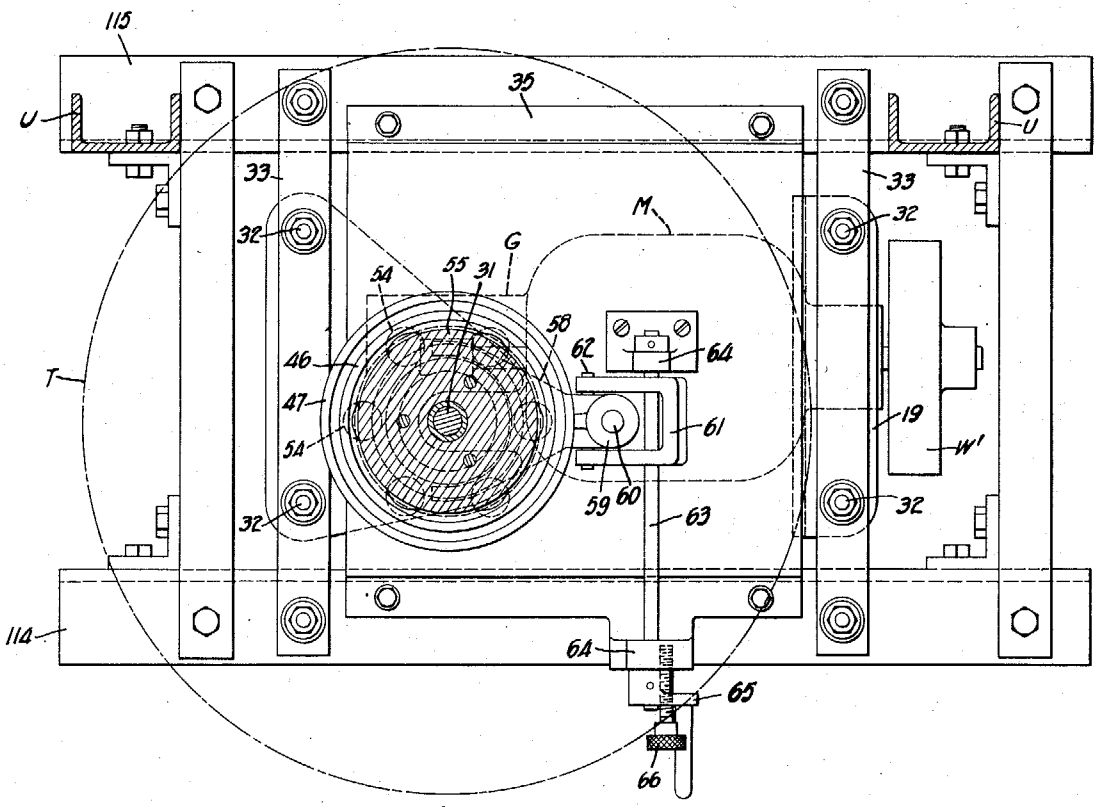
Fig. 4 is a view in horizontal section on the line 4—4 of Fig. 3.
Figure 5:
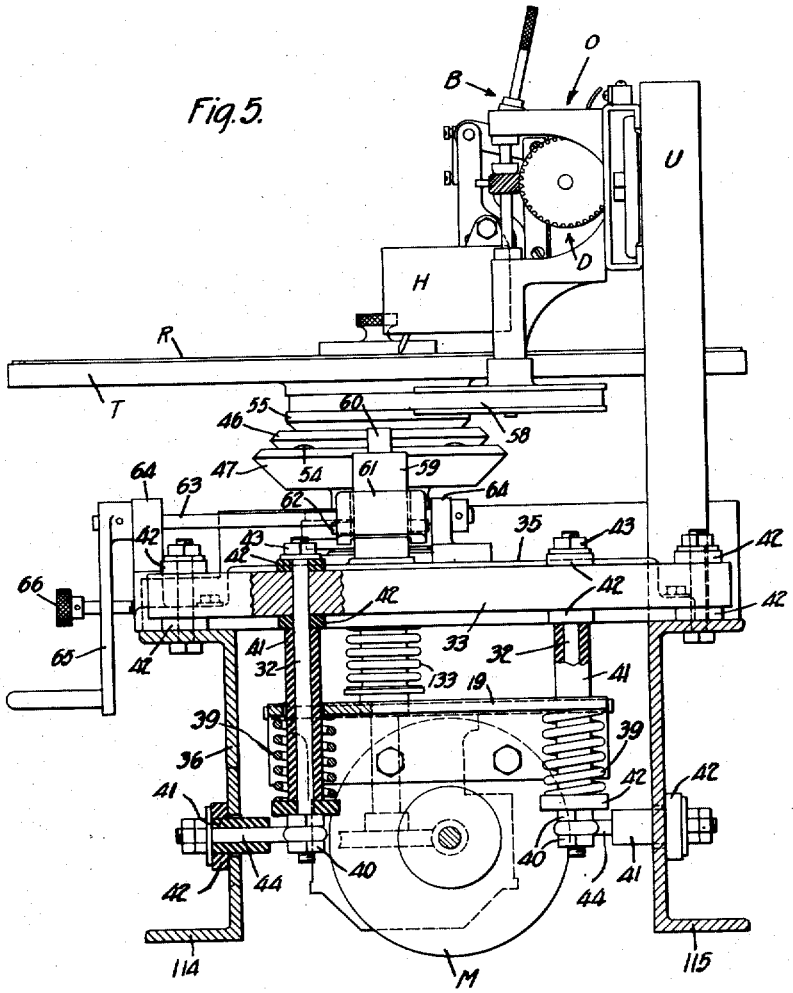
Fig. 5 is a fragmentary, detail view in section on the line 5—5 of Fig. 3.

The collar 48 has another coupling stud 53 which acts at all times to connect the member 47 against rotation relatively to the collar 48, so that in the Fig. 3 position of collar 48 the member 47 is held still and serves as a track on which driving balls 54 can run, under rotative impulsion by the member 46 as it is driven by shaft 31. In the instance illustrated in Fig. 3, the collar 58 is set to cause table T′ to be driven at 78 R. P. M. when the member 46 is driven at 33⅓ R. P. M. with the balls 54 running between member 47 and a driven member 55 to which the table T′ is secured by means of one or more screws 56.

Figure 6:
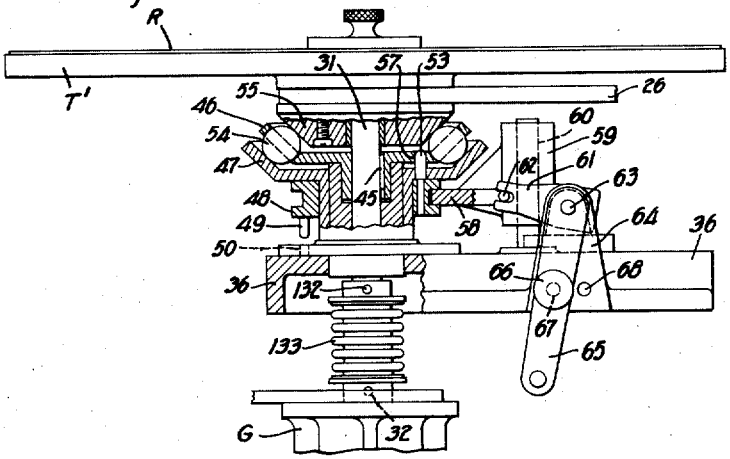
Fig. 6 is a fragmentary detail view in vertical section of certain of the parts illustrated in Fig. 3, but shown in a different operative position.

In further pursuance of the invention, provision is made to shift clutch collar 48 to the position illustrated in Fig. 6 where pin 49 is shown as freed from the recess 50, and pin 53 is shown as raised into a recess 57 of member 46, so that balls 54, member 55 and the table T′ all rotate at uniform speed, viz., 33⅓ R. P. M., the speed of the shaft 31. By means of the driving belt 26 (see Fig. 1) the feed screw L of the overhead mechanism is driven at the desired speed ratio.

The clutch collar 48 is under manual control by means of a yoke 58 carried by a slide 59 on a post 60, the slide being movable to selective positions by a forked lever 61, engaged with a pin 62 on the slide, and which is itself turned by a rock shaft 63 mounted in bearings 64 on the platform 35, a crank-handle 65 serving to set the clutch in either of the two positions already described, where a locking bolt 66 may be employed to hold the crank, this bolt taking into one or the other of two holes 67 and 68, being shown in the last named hole in Fig. 3 and in the hole 67 in Fig. 6.

In certain of the figures, a fly-wheel W′ of conventional form is provided on the motor shaft and functions in the conventional manner as a power-storing and steadying element for the whole system of moving parts included in the machine, it being provided to assist in eliminating the effect of the pulsation of the synchronous motor M. I have observed, by the use of the novel type of fly wheel W, I have entirely eliminated these various undesirable pulsations, oscillations and vibrations. This fly wheel W is shown in Fig. 7, other desirable improvements in structure being also disclosed in connection with this figure.

Figure 7:
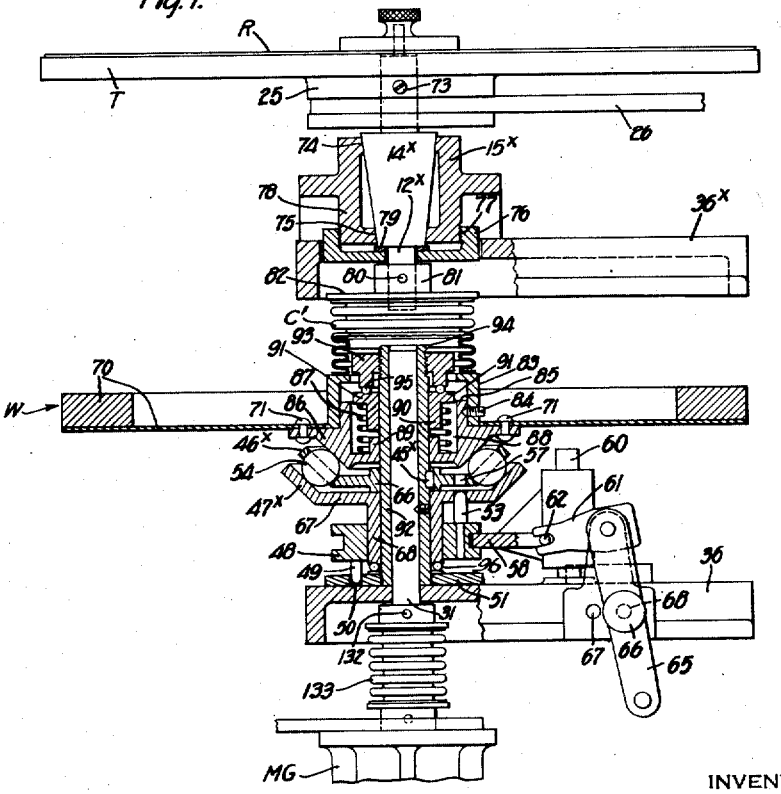
Fig. 7 is a fragmentary detail view in vertical section, similar to Fig. 3, but showing a modification.

Various elements shown in Fig. 7 are identical in structure and purpose with parts similarly designated in the structure illustrated in Figs. 1 and 2, and as these have been fully described, no extended description thereof need be added.

Such parts include the synchronous motor and gearbox of which a fragment only appears at MG in Fig. 7; also the flexible coupling 133 adapted to drive the upright shaft 31, being fixed thereto at 132; also the rotatable table T adapted to support the blank R, and having a member 25 serving as a pulley to drive the belt 26 running to the record engraving and/or playing mechanism overhead, as in Figs. 1 and 2.

The balls 54 and their driving cage 46*x* are actuated, in similar fashion to that already described, with reference to Fig. 3, by the shaft 31, connected to member 46*x* by a key 45*x*, it being noted that the hub 66 is somewhat shorter than that of the structure hereinbefore described. In the present modification this hub rests against the central web 67 of the driving flange 47*x* on which the balls 54 are supported, in the manner, and for the purpose, already described. The driven member 86 of this power transmitting system, in the present instance, serves as the hub of the flywheel W, which has a central web 70 bolted to the hub as at 71.

In further pursuance of the invention, the propagation and transmission of vibrations originating in the synchronous motor are damped by a novel and efficient means, comprising the elements now to be described, with reference to Figs. 1, 2 and 7 and which are included in the connections between what has been termed the main transmission shaft 31 and the driven shaft 12*x*, the latter being in the Fig. 7 structure, a short shaft on which the table member T is fixed by a screw 73, this shaft having a conical bearing part 14*x*, journalled in a bearing part 15*x* which, like that shown at 15 in Figs. 1 and 2, is mounted on a platform 36*x* which is carried by the main frame of the machine, like the platform 36 already described.

The bearing surfaces 74, 75 spaced apart vertically, and of ample extent, afford a novel and sturdy support for the rotating table T and one independent of any reliance upon the underlying driving connections, and this is characteristic also of the table T in Figs. 1 and 2, as supported on its cone bearings 14, 15 and as turned by shaft 12. Nor does the weight of the cone 14*x* and its associated table rest directly upon the surfaces 74 and 75, inasmuch as a hardened end bearing cup 76 is screwed upon a threaded outer surface 77 of the boss 78 which contains bearing part 75, and in this cup is carried an end thrust hardened bearing ring 79, on which the overhead rotating table element is carried.

On the part 12x of the short shaft is secured suitably, as by a pin 80 a collar 81 fixed to the adjacent upper end 82 of a flexible metal bellows-type connector C' like the connector 133 already mentioned, and which is designed to serve as a universal shock absorber for any and every sort of vibration, oscillation or aberration, vertical, horizontal or tilting, that might otherwise be communicated to the table T by the underlying driving mechanism.

The bellows-type connector C' is secured to an inverted cup-shaped member 83 which is fixed by set-screw 84 upon an upright boss 85 integral with a driven member 86.

In further pursuance of the invention, the member 86 is biased strongly against the balls 54 and the latter are biased against the member 47x by a spring 87 coiled under compression within a cavity 88 of cylindrical contour surrounding a hub part 89 extending upwardly from the web of member 86, and a similar boss 90 extending downwardly from a collar 91 fitted loosely upon a fixed sleeve 92 which surrounds the shaft member 31. Upon the upper, threaded end 94 of the sleeve is screwed adjustably a bearing ring 93, which constitutes a race for anti-friction balls 95 provided to take up the end-thrust on the member 91. A similar ball bearing is provided at 96 between the fixed base 51 and the foot of member 68.

Any rotative aberration or oscillation of the fly-wheel W is thus strongly resisted by the above means, and the member C', as already noted, completely avoids the propagation of such aberrations as may be present in spite of the counteractive provisions.

It prevents the rolling effect of the balls 54 from being transmitted to the table T. The bearing 14x, 15x is extremely solid and any difficulty in fitting, and any arising from excess of friction can be avoided, owing to the flexible character of the coupling C'. Similarly, the flexible coupling 133 prevents any electrical lock of the synchronous motor M from being transmitted as a torsional shock or undue retardation to the table T. Such locking is particularly perceptible in frequencies below 100. Inaccuracies of diameter do not show up at 33⅓ R. P. M. because of lack of any movement of the member 47x.

I have described what I believe to be the best embodiments of my invention. I do not wish, however, to be confined to the embodiments shown, but what I desire to cover by Letters Patent is set forth in the appended claims.

I claim:

1. A turntable driving mechanism for phonographs comprising, in combination, an annular member adapted to turn the table when itself rotated, a second annular member disposed coaxially with, and adjacent to, said first-named annular member, a ring of rolling members intermediate said annular members, a cage member of annular form for said ring of rolling members, a drive shaft extending through both said annular members and connected at an intermediate point to said cage member and coupling means adapted to control actuation of said turntable through said annular members at different speeds selectively, said annular members, rolling members, and coupling means being so co-ordinated that said driving means may be rotated at a constant minimum speed, less than that of certain of the selective speeds.

2. A machine characterized by the elements combined and cooperating as set forth in claim 1, and further characterized by having said driving means connected to drive said cage constantly at a speed not exceeding the lowest selective speed of the turntable, and by having said coupling means adapted to couple said cage selectively to said second-named annular member thereby to cause at will the co-rotation of said annular members at a speed not exceeding the lowest turntable speed, and selectively to cause the rotation of the first-named annular member and turntable by the rolling members at a speed exceeding that of the cage speed by a predetermined ratio.

3. A turntable driving mechanism for phonographs comprising, in combination, a truncated conical annular member adapted to turn the table when itself rotated, and serving as a track for a ring of rolling members, a dished second annular member disposed coaxially with, and adjacent to, said first named annular member, having an inclined flange adapted to serve as a track, a series of rolling members intermediate said annular tracks, a dished cage for said series of rolling members, intermediate said tracks, an upright shaft extending through said second annular member and into said truncated conical member and connected at an intermediate point to said cage, coupling means adapted to control actuation of said first-named annular member through said second-named annular member at different speeds selectively, and means to complete said connections manually to cause selective rotation of said turntable at the desired speed, said coupling means comprising a collar movable co-axially with respect to said upright shaft and having a stud movable vertically into and out of a recess in said cage to connect the same with said second annular member for co-rotation, and to disconnect the same to permit the roller ring to transmit a moment of increased rotation to said first-named annular member and the turntable.

4. A turntable driving mechanism for phonographs comprising, in combination, an upright shaft, an annular member mounted upon the shaft and adapted to turn the table when itself rotated, a second annular member disposed coaxially with, and adjacent to, said first-named annular member and having an opening through which the shaft extends, a series of rolling members intermediate said annular members, a cage for said series of rolling members, means connecting the cage and shaft to rotate the cage in unison with the upright shaft, and coupling means adapted to control actuation of said first-named annular member through said cage and second-named annular member at different speeds selectively, said annular members being each provided with a peripheral track disposed at an angle to the axis of rotation, and at an angle to the plane of the body of the annular member, and said cage having a flange disposed at a like angle between said annular member tracks.

5. In a turntable driving mechanism for phonographs, in combination, an upper race for driving said turntable, a lower race, rolling members interposed between said races, a cage for said rolling members, means for actuating said cage positively at a constant low speed, and means for controlling the lower race to bring about changes in the speed of said turntable and comprising a hollow socket member arranged to form a journal bearing for said lower race and also to support said cage.

6. In a turntable operating mechanism for phonographs, in combination, a motor, a shaft driven thereby, a bellows driven by the shaft, a change speed gearing driven by the bellows, a flywheel driven by the change speed gearing, a second bellows driven by the flywheel, and a turntable operating member driven by the second bellows.

7. In a turntable operating mechanism for phonographs, in combination, a rotary driving member, a bellows driven by the rotary member, a frictional change speed transmission unit driven by the bellows, a flywheel driven by the change speed gearing, a second bellows driven by the flywheel, and a turntable operating member driven by the second bellows; all of the named parts being arranged in coaxial relation.

8. A turntable operating mechanism for phonographs, as set forth in claim 7, in which provision is made of adjustable means for regulating the pressure between the members of the frictional change speed transmission unit without substantially affecting the stress of the bellows.

9. In a turntable driving mechanism for phonographs, the combination of an upper race adapted for connection to the turntable, a lower race, a set of balls interposed between said races, a carrying cage for said balls, power driven means for rotating said cage at a steady low speed, means for selectively rotating said lower race or preventing its rotation and a compression spring arranged to maintain the balls in compression between the races.

10. A mechanism having the elements combined and cooperating as set forth in claim 9 and having an annular member spaced from the upper race and rotatable therewith and having the compression spring interposed between said annular member and a portion of the upper race.

11. In a turntable operating mechanism for phonographs, in combination, a rotary driving member, a bellows driven by the rotary member, a frictional change speed transmission unit driven by the bellows, a flywheel driven by the transmission unit, a second bellows driven by the flywheel, said driving member, transmission unit, flywheel and both of said bellows being arranged in coaxial relation; means for regulating the pressure between the members of the transmission unit without substantially affecting the stress of the bellows, an inverted conical member connected to said second bellows and adapted for connection to a turntable, a conical bearing surrounding said conical member and a cup threaded to the bearing and engageable beneath the conical member to take the load off the conical faces of the conical member and bearing.

12. In a mechanism for driving a phonograph turntable at two selective speeds, the combination of an upper race for connection to the turntable, a lower race, a set of balls interposed between said races, a carrying cage for said balls, spring means maintaining the balls in compression between the races, a drive shaft rotating at a constant low speed extending through, and operatively connected to one of the three elements consisting of said cage and races, and movable coupling means for controlling rotation of said turntable by said drive shaft at two selective speeds, the coupling means being movable to one position to cause transmission to the turntable the same speed as the drive shaft and to the other position to cause transmission to the turntable a speed higher than the speed of the drive shaft.

13. A mechanism for driving a phonograph turntable at two selective speeds comprising, in combination, a three element power transmitting apparatus: one of said elements comprising an annular member rigidly mounted on the bottom of the turntable and concentric therewith for receiving rotary power to rotate the turntable, a second element comprising a second annular member disposed coaxially with, and adjacent to, said first-named annular member, the third element being coaxial with, and interposed between, the first and second elements and comprising an annular cage and a ring of rolling members carried by said cage, in contact with the other two elements; a drive shaft rotatable at a constant low speed and extending through, and operatively connected to one of said three elements, and movable coupling means for controlling actuation of said turntable by said drive shaft at two selective speeds, said coupling means being movable to one position to cause transmission to the turntable the same speed as the drive shaft, and to the other position to cause transmission to the turntable a speed higher than the speed of the drive shaft.

14. In a mechanism for driving a phonograph turntable at two selective speeds, the combination of an upper race, a lower race, a set of balls interposed between said races, a carrying cage for said balls, spring means maintaining the balls in compression between the races, a drive member rotating at the lower of the two selected speeds, a drive shaft extending through, and operatively connected to one of the three elements consisting of said cage and races, and movable coupling means for controlling rotation of said turntable by said drive shaft at two selective speeds, the coupling means being movable to one position to cause transmission to the turntable the same speed as the drive member and to the other position to cause transmission to the turntable a speed higher than the speed of the drive member.

15. A mechanism for driving a phonograph turntable at two selective speeds comprising a turntable driving race, a cooperating race, a set of balls between said races, a carrying cage for the balls, drive means, a drive shaft extending through, and operatively connected to one of the three elements consisting of said cage and races, and means for selectively controlling the rotation of the turntable by the drive means at two speeds comprising means operative in one position of the control means to cause transmission of the speed of the drive means to the driving race, and means operative in another position of the control means to cause transmission to the driving race a speed higher than the speed of the drive means, and means for maintaining the cooperating race in stationary position.

16. A phonograph turntable drive mechanism for driving the turntable at two selective speeds, comprising a unit consisting of an upper race adapted for direct connection to the turntable, a lower race, a set of balls interposed between said races and a carrying cage for the balls; a rotary drive member rotatable at the lower of the two selective speeds, and a coupling device disposed below said unit, said coupling device comprising a pin, said cage having a recess adapted to receive one end of said pin, said coupling device being movable selectively into either of two positions to bring said pin into engagement with or disengagement from said cage, and being operative in one position to provide an operative connection from the drive member to the unit for driving the turntable at the lower of the two selective speeds in which the drive member and the upper race are held against movement relative to each other for synchronous rotation, said coupling device being operative in the second position to provide an operative conection from the drive member to the unit for driving the turntable at the higher of the two selective speeds, in which the lower race is held against rotation and the upper race is driven at a speed higher than the speed of the drive member, the cage being driven at the speed of the drive member.

17. A phonograph turntable drive mechanism for driving the turntable at two selective speeds, comprising a unit consisting of an upper race adapted for direct connection to the turntable, a lower race, a set of balls interposed between said races and a carrying cage for the balls; a rotary drive member rotatable at the lower of the two selective speeds; and a coupling device disposed below said unit, said coupling device and said cage being provided with separable cooperating connecting means, said coupling device being movable selectively into either of two positions to connect the coupling device and cage by said connecting means and to disconnect said coupling device and said cage, and being operative in one position to provide an operative connection from the drive member to the unit for driving the turnable at the lower of the two selective speeds in which the drive member and the upper race are held against movement relative to each other for synchronous rotation, said coupling device being operative in the second position to provide an operative connection from the drive member to the unit for driving the turntable at the higher of the two selective speeds, in which the lower race is held against rotation and the upper race is driven at a speed higher than the speed of the drive member, the cage being driven at the speed of the drive member.

BARTON A. PROCTOR.